July 25, 1939. H. A. GEHRES 2,166,930
INTERNAL COMBUSTION ENGINE
Filed June 3, 1937 3 Sheets—Sheet 3

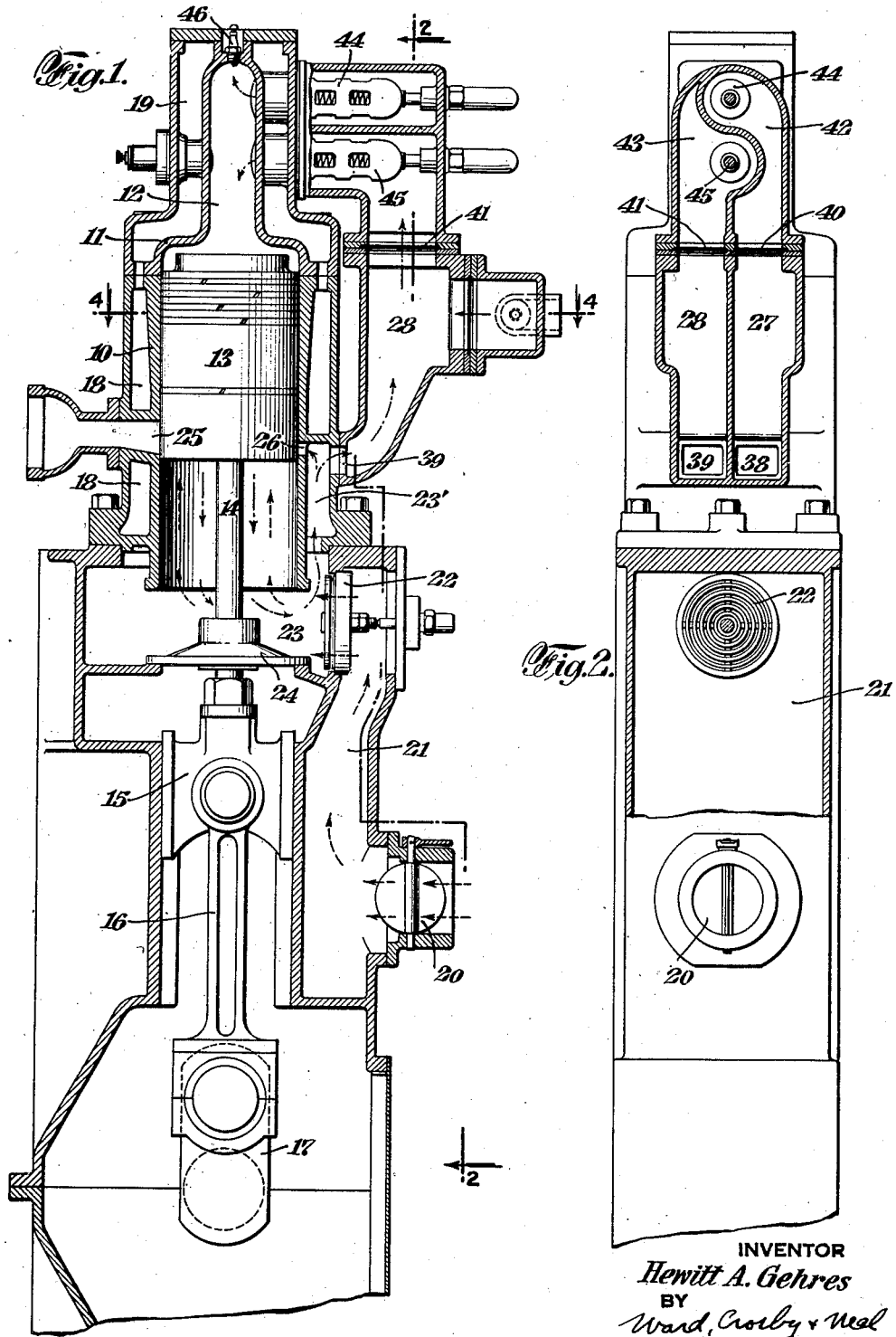

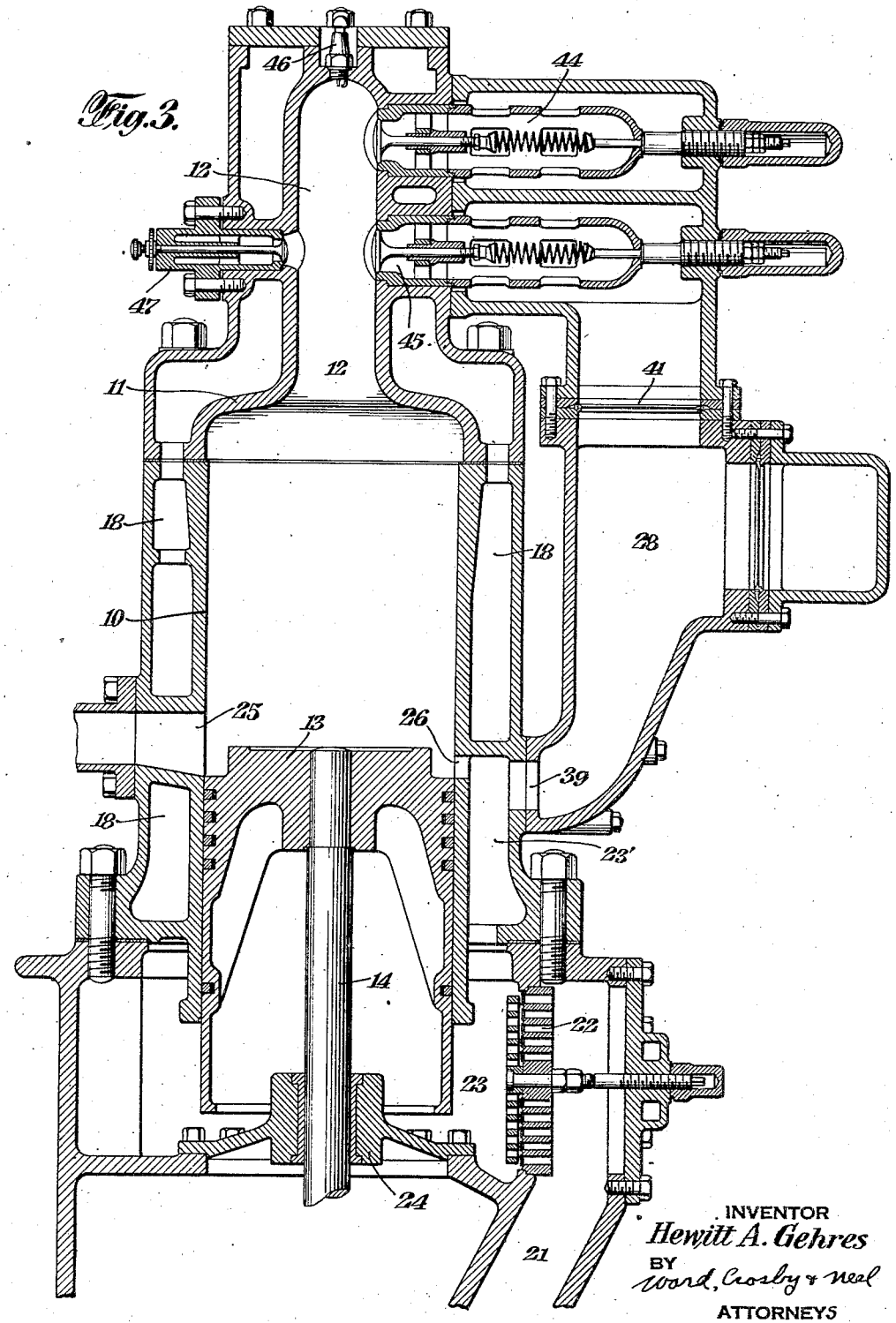

INVENTOR
Hewitt A. Gehres
BY
Ward, Crosby & Neal
ATTORNEYS

Patented July 25, 1939

2,166,930

UNITED STATES PATENT OFFICE 2,166,930

INTERNAL COMBUSTION ENGINE

Hewitt A. Gehres, Mount Vernon, Ohio, assignor to Cooper-Bessemer Corporation, Mount Vernon, Ohio, a corporation of Ohio Application June 3, 1937, Serial No. 146,185

9 Claims. (Cl. 123—65)

This invention relates to internal combustion engines and methods of operating the same.

The invention in the particular form hereinafter described is applied to a two-stroke cycle gas engine. Prior two-cycle engines in general have a number of disadvantages which may be overcome by the present invention. With the usual two-cycle engine a mixture of air and gas is drawn into a chamber through a check valve by the action of the power piston during its compression stroke. This charge is compressed during the expansion stroke of the piston and near the end of the expansion stroke when the intake and exhaust ports are both opened, the mixture of gas and air flows into, and to some extent through the cylinder, forcing out the burned gases and leaving a mixture in the cylinder of widely varying and often unsatisfactory combustion characteristics. Regulation of such prior engines has been effected by way of varying the quantity of gas admitted with the air and since the quantity of air admitted remains practically constant, the percentage of gas in the mixture varies widely. Since for ideal or even satisfactory combustion conditions, this percentage has to be kept within a very narrow range, it is evident that at light loads and also at extremely heavy loads, the mixture becomes either too lean or too rich to give proper combustion. As a result, in prior two-cycle engines the firing is intermittent and the operation of the engine is irregular and uneconomical. The low ecenomy of this type of engine is not only caused by irregular operation, but also because of the scavenging being done with a mixture of air and gas, a substantial part of the gas escapes through the exhaust ports unburned.

According to the present invention, an engine construction and method of operating the same is provided whereby scavenging air may be admitted at one end of the cylinder or combustion chamber and the burned gases with some air may be exhausted at or adjacent this same end of the chamber, but meanwhile the fuel may be admitted at the other end of the chamber, or at a point remote from the air intake and exhaust ports, in a manner such that no valuable amount of unburned fuel escapes. Furthermore, with the preferred form of the present invention, the gas or other fuel admitted to the cylinder may be admitted into two different zones within the combustion chamber, one of the zones for example being supplied with a fuel and air mixture having substantially the ideal percentage of fuel for prompt and substantially perfect combustion, and the other zone being supplied with a quantity of gas or other fuel in which the percentage of fuel is generally too great for ideal combustion conditions. The amount of fuel admitted to this second zone may be widely varied to meet different loads. Then with this arrangement and method, the atmosphere within the combustion chamber is more or less stratified, i. e., with first a stratum remote from the air intake and exhaust ports, comprising substantially an ideal combustible mixture, second a stratum embodying a variable quantity of fuel generally too rich for ideal combustion, and third a stratum or volume of air remaining from the scavenging operation. Then upon compression of these strata, ignition and combustion of the first causes the second stratum to be forced into admixture with the air stratum and at some moment as the second stratum is being mixed with the air, conditions will be ideal for thorough combustion of the fuel of the second stratum. With this operation, regular firing even with widely varying loads is insured and with no substantial loss of unburned fuel. The two supplies of fuel may be compressed and admitted by apparatus forming a part of the engine itself, or if desired, these two fuel supplies may be provided from pumps with valves suitably timed to deliver the respective charges after the cylinder exhaust ports are closed, so as to prevent any loss of unburned fuel to the exhaust. Also in some cases if desired, both of the separate fuel supplies may be varied either manually, or automatically by well-known governing apparatus.

Various further and more specific objects, features and advantages will clearly appear from the detailed description given below taken in connection with the accompanying drawings which form a part of this specification and illustrate merely by way of example a preferred form of the invention. The invention consists in such novel features, arrangements, combinations of parts and methods as may be shown and described in connection with the apparatus herein disclosed.

In the drawings, Fig. 1 is a sectional view of an engine embodying one example of the invention, this section being taken longitudinally of the cylinder;

Fig. 2 is a sectional view taken substantially along the line 2—2 of Fig. 1;

Fig. 3 is an enlarged view of a portion of Fig. 1, certain parts being shown in further sectional detail;

Figure 4:
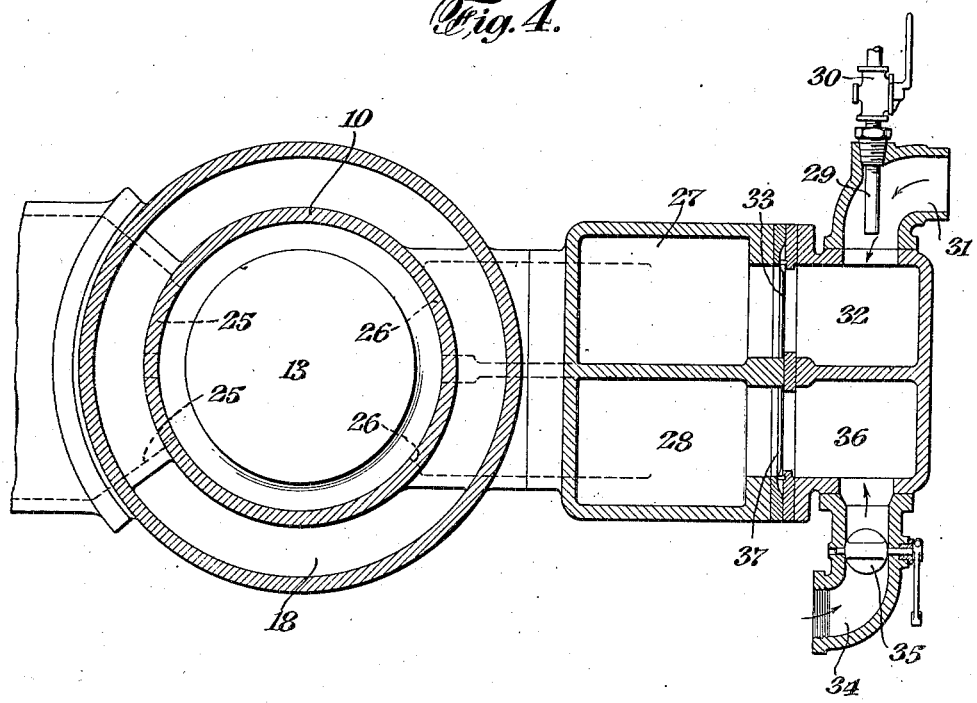
Fig. 4 is a further sectional view taken substantially along the line 4—4 of Fig. 1.

The engine as shown in Fig. 1 may comprise a cylinder 10 with a cylinder head 11 formed with an elongated cavity or chamber as at 12 comprising an extension of the combustion chamber including the cylinder. A piston is shown at 13 connected to a piston rod 14, which in turn may be connected as by a cross head 15 and connecting rod 16 to a crank shaft 17. The cylinder may be substantially surrounded by a suitable water jacket or other cooling means. For example, as here shown, cooling fluid cavities are provided as at 18 and 19 surrounding respectively the cylinder and the elongated cavity 12.

Air may be admitted through an adjustable butterfly valve 20 to a cavity 21. When the piston is moving on its compression stroke, this air will be drawn through a suitable form of flap check valve 22 into a chamber 23. This chamber may be closed in respect to the crank case by any suitable means such as a flanged member 24 having a central aperture with suitable packing, permitting the piston rod to reciprocate therethrough.

During the expansion stroke of the piston, the air within chamber 23 will first be compressed and then when the piston arrives at a point near the completion of its expansion stroke, a cylinder exhaust port 25 will be opened and soon thereafter an air intake port 26 will be opened, thus admitting the compressed air into the cylinder for scavenging purposes. The face of the piston may be shaped as shown, so as to suitably deflect this air into the cylinder and to cause thorough scavenging, and whereby some of this air, together with the burned gases, are forced out through the exhaust port 25.

At the time of this scavenging operation, means is also provided as hereinafter described, for supplying a quantity of a substantially ideal combustible mixture within the upper end or zone of the elongated cavity 12, and also a variable quantity of raw gas or other fuel generally too rich for perfect combustion, into a lower zone of the cavity 12. The two supplies of fuel thus separately admitted to these zones will be more or less stratified within the chamber extension 12, and the scavenging air and burned gases during the scavenging operation will have little opportunity to mix therewith, and thus exhaust of unburned fuel through the port 25 will be avoided.

Referring now particularly to Figs. 2 and 4, a chamber 27 may be provided for receiving quantities of an ideal combustible mixture, for example, of air and gas. A chamber 28 may be provided for receiving quantities of fuel, for example raw gas, in amounts varied according to the load effective on the engine or the desired speed thereof. Generally the fuel admitted through chamber 28 will be too rich for ideal combustion. The same or different kinds of fuel may be admitted to the chambers 27 and 28 respectively, but normally the quantity of fuel admitted to these chambers will differ, as will also the percentage of fuel present. If the fuel used comprises gas of the type ordinarily used with engines of this class, then the gas for the mixture in chamber 27 may be supplied through a pipe or nozzle 29, connected through a valve 30 to a suitable source of supply. Air supplied through an inlet 31 becomes mixed with this gas within a cavity 32 connected with the chamber 27 through a suitable check or flap valve 33. The raw gas or other fuel for the chamber 28 may be admitted through a supply pipe 34 having a butterfly valve 35 for varying the supply of fuel entering a cavity 36. The cavity 36 may be connected with the chamber 28 by a valve 37 similar to the valve 33. The butterfly valve 35 may be operatively connected to a governor in any suitable well-known manner so that the amount of fuel passed may be varied in accordance with the load effective on the engine.

Referring to Figs. 1 and 2, it will be noted that the air chamber 23 is provided with an extension cavity 23' for communicating with the air inlet port 26. The extension cavity 23' may also be brought into communication with the chambers 27 and 28 through apertures as at 38 and 39 respectively. Thus as the piston draws air into the chamber 23 through valve 22, as above described, it will also cause air to be drawn from chambers 27 and 28 through apertures 38 and 39. This in turn will cause quantities of the fuel or fuel mixture to be drawn from cavities 32 and 36 into chambers 27 and 28. However, since the cavities 27 and 28 are relatively elongated, the amount of fuel drawn in will be insufficient to cause the fuel to pass into the chamber extension 23'. Yet a fixed amount of the ideal combustion mixture will be drawn into the chamber 27, but this amount will be insufficient to fill the entire length of this chamber. And a variable charge of the raw gas or other fuel is similarly drawn into the chamber 28, but due to the elongated form of this chamber, it will not be entirely filled with the charge when the compression stroke of the piston is completed, and hence fuel will not be drawn into the scavenging air and become mixed therewith.

Now, when the piston moves on its expansion stroke, compression of the air within chamber 23 will cause air pressure to be supplied through chamber extension 23' and apertures 38 and 39 to the fuel or fuel mixtures within chambers 27 and 28. This pressure will force the fuel or mixtures from chambers 27 and 28 through check or flap valves as at 40 and 41, into passages 42 and 43 respectively. We now have in passage 42 a predetermined charge of an ideal combustion mixture under pressure. And passage 43 also contains under pressure a suitable charge of raw gas for example, sufficient to complete the fuel requirements for the next stroke of the engine. At the time that the air intake and exhaust ports 26 and 25 are uncovered, the pressure in the cylinder drops sufficiently so that the two fuel charges in passages 42 and 43 force their way through valves as at 44 and 45 respectively, into the zones surrounding the outlets of these valves within the combustion chamber extension 12. The valves 44 and 45 may comprise any suitable well-known type of free poppet valves.

Figure 5:
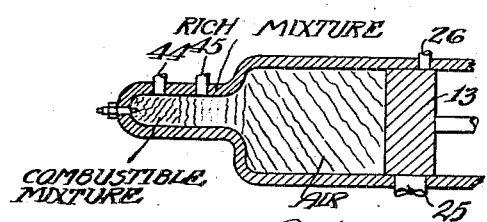
Fig. 5 somewhat schematically indicates conditions in the engine cylinder at the beginning of compression of the fuel charges.

As the movement of the piston proceeds with its next compression stroke, the air intake port 26 will first be closed and shortly thereafter the exhaust port 25 will be closed and the main body of the cylinder will contain a stratum of air. Next to this stratum will be a stratum of fuel within the lower end of the extension 12, this stratum generally being too rich for ideal combustion. And a third stratum of an ideal combustible mixture will be located in the upper end of the extension 12 surrounding a spark plug as at 46 or other suitable ignition means (see Fig. 5). The ignition means may be properly timed in any suitable well-known way to ignite the stratum of the ideal combustible mixture at the proper moment of compression of the three strata. Then the initial combustion of the mixture within the upper end of extension 12 will immediately cause the next stratum, over-rich in fuel, to become admixed with the air stratum. At the moment when this mixing has progressed to the extent of giving a highly combustible mixture, the burning of the ideal mixture stratum will promptly cause combustion of the remainder of the charges to proceed to substantial completion.

The term "gas" as used in the appended claims is intended to comprehend atomized fuel as well as fuel in strictly gaseous condition.

While the invention has been described in detail with respect to a particular preferred example, it will be understood by those skilled in the art after understanding the invention that various changes and further modifications may be made without departing from the spirit and scope of the invention, and it is intended therefore in the appended claims to cover all such changes and modifications.

What is claimed as new and desired to be secured by Letters Patent is:

1. The method of operating an internal combustion engine which comprises establishing within an explosion chamber thereof, a stratum of a readily combustible gas and air mixture, another stratum containing a substantially greater proportion of gas, and still another stratum comprising air, and igniting said first named stratum whereby the explosion thereof causes the other two strata to merge and explode, and varying the power produced by adjusting the quantity of gas in said second named stratum, while maintaining the proportions of gas and air in said first named stratum within limits to insure therein, prompt and thorough combustion upon ignition.

2. In a two stroke cycle internal combustion engine, an explosion chamber with a reciprocating piston therein, means including an intake port adjacent one end of the chamber for introducing air under pressure, means for concurrently discharging products of combustion from the chamber, including an exhaust port adjacent said end but spaced from said intake port, said ports being closed by the piston except when the piston is adjacent its extreme position at said end, means for introducing gas or a rich gas mixture into a zone adjacent the other end of the chamber when the piston is adjacent the first named end of the chamber, means for then also introducing a gas mixture highly favorable to combustion into a second zone adjacent said first named zone in the chamber, and ignition means located in said second zone and actuated when the piston has compressed the gas and gas mixtures in said zones.

3. In an internal combustion engine, an explosion chamber with a reciprocating piston therein, means including an intake port for introducing air under pressure into said chamber at the termination of an expansion stroke of the piston, means for concurrently discharging products of combustion from the chamber, including an exhaust port spaced from said intake port, means for introducing gas or a rich gas mixture into a zone of said chamber spaced from said ports, means for then also introducing a gas mixture highly favorable to combustion into a second zone adjacent said first named zone in the chamber, and ignition means located in said second zone and operable when the piston has compressed the gas and gas mixtures in said zones.

4. In a two-stroke cycle internal combustion engine, an explosion chamber with a reciprocating piston therein, means including a surface of said piston external to said chamber for providing a supply of air under pressure, means utilizing said pressure to provide supplies of gas under pressure, means also utilizing said pressure to provide supplies of a readily combustible gas mixture under pressure, and means for admitting said air, said gas, and said gas mixture, separately at spaced points into the chamber, in predetermined timed relationships.

5. In a two-stroke cycle internal combustion engine, a cylinder, a reciprocating piston therein, means for admitting and exhausing scavenging air adjacent one end of said cylinder, and means adjacent the other end of the cylinder for admitting two different combustion fluid mediums at separate points, in substantially a predetermined timed relationship with the admission and exhaustion of the scavenging air.

6. In a two-stroke cycle internal combustion engine, a cylinder, a reciprocating piston therein, a gas chamber, an air chamber communicating with said gas chamber, means whereby the piston on its compression stroke draws air into said air chamber and gas into said gas chamber, a second gas chamber, means whereby said piston on its expansion stroke compresses said air and said air forces said gas into said second chamber, and means whereby approximately at the termination of the expansion stroke, the compressed air is admitted to the cylinder and the gas in said second gas chamber is also admitted to the cylinder at a point spaced from the point of air admission.

7. In a two-stroke cycle internal combustion engine, a cylinder, a reciprocating piston therein, a gas chamber, a gas mixture chamber, an air compression space communicating with both of said chambers, means whereby the piston on its compression stroke draws air into said space, and gas and a gas mixture into said chambers respectively, means whereby said piston on its expansion stroke compresses said air and said air applies pressure to said gas and gas mixture, and means whereby approximately at the termination of the expansion stroke, the compressed air, gas, and gas mixture, are separately admitted to the cylinder.

8. In an internal combustion engine, a cylinder, a reciprocating piston therein, a pair of chambers for receiving two different combustion mediums, an air compression space communicating with both of said chambers, means whereby the piston on a compression stroke draws air into said space and two different combustion mediums into said chambers respectively, a second pair of chambers, means whereby said piston on its expansion stroke compresses said air and said air forces said combustion mediums respectively into said second pair of chambers, and means for then admitting the compressed air and said combustion mediums respectively at three spaced points into the cylinder.

9. The method of operating a two-stroke cycle internal combustion engine which comprises establishing within an explosion chamber thereof, a stratum comprising air adjacent the movable power transmitting element within the chamber, a second stratum of a relatively combustible gas and air mixture in a region within the chamber remote from said power transmitting element, and a third stratum in the region between the two first-named strata, said third-named stratum being too rich in combustible gas to insure ready ignition and being introduced separately from but substantially concurrently with the introduction of the second-named stratum, igniting said second-named stratum whereby the explosion thereof causes the other two strata to merge and explode, and varying the power produced by adjusting the quantity of gas in said third-named stratum, while maintaining the proportions of gas and air in the second-named stratum within limits to insure therein prompt and thorough combustion upon ignition.

HEWITT A. GEHRES.